United States Patent
D'Arcy et al.

(10) Patent No.: US 6,795,544 B1
(45) Date of Patent: Sep. 21, 2004

(54) METHOD FOR PUBLIC CONVERSATION INDICATION IN A TELEPHONY EXCHANGE

(75) Inventors: Paul D'Arcy, Dun na Coiribe (IE); Michael Brosnan, Knocknacarra (IE); Trevor Fahey, Castleboy (IE)

(73) Assignee: Nortel Networks Limited, St. Laurent (CA)

( * ) Notice: Subject to any disclaimer, the term of this patent is extended or adjusted under 35 U.S.C. 154(b) by 302 days.

(21) Appl. No.: 09/708,383

(22) Filed: Nov. 8, 2000

(51) Int. Cl.$^7$ ............................................... H04M 7/00
(52) U.S. Cl. .................................. 379/219; 379/420.01
(58) Field of Search ..................... 379/202.01, 221.01, 379/219, 420.01, 188, 201.01, 194, 230

(56) References Cited

U.S. PATENT DOCUMENTS

| | | | |
|---|---|---|---|
| 5,319,702 A | * 6/1994 | Kitchin et al. | 379/386 |
| 5,568,540 A | * 10/1996 | Greco et al. | 379/89 |
| 5,579,383 A | * 11/1996 | Bales et al. | 379/212 |
| 5,615,253 A | * 3/1997 | Kocan et al. | 379/210 |
| 5,668,862 A | * 9/1997 | Bannister et al. | 379/201 |
| 5,926,533 A | * 7/1999 | Gainsboro | 379/188 |
| 5,995,607 A | * 11/1999 | Beyda et al. | 379/202 |
| 6,587,553 B1 | * 7/2003 | Shaffer et al. | 379/188 |

* cited by examiner

Primary Examiner—William J. Deane, Jr.
(74) Attorney, Agent, or Firm—Barnes & Thornburg LLP

(57) ABSTRACT

A telephony exchanges allows terminating equipment to indicate whether a telephone call is public, where the telephone conversation may be heard by more than one person at a remote end of a call, or private, where a person at the remote end of a call employs, for example, a handset or a headset. A calling party can restrict a called party from holding a call in a public mode if so desired either before or during the call and is provided through their terminating equipment with an up-to-date graphical display, textual display or physical indication of the status of whether the called-party is operating in a public mode. The called party may also be provided through their terminating equipment with an up-to-date graphical display, textual display or physical indication that they should not put a call on speaker, if the calling party has so decided. If the calling party decides during a call to restrict a call to private mode, the calling party's terminating equipment indicates this and also, if necessary, a prompt is played informing the called party to change to private mode.

22 Claims, 5 Drawing Sheets

Set A                              Set B

1) Set A lifts it's handset

Hook switch released (I)
    Handset on (O)
    Lamp 0 on (O)
    Update Display – Dial Tone (O)

2) Set A dials the DN of Set B (1001)

Key pad 1 pressed (first digit) (I)
    Add 1 to display (O)
    Keypad 1 released (I)
    .
    .

Key pad 1 pressed (last digit) (I)
    Add 1 to display (O)
                                Flash Lamp 0 (O)
                                  Ring/Buzz on (O)
    Keypad 1 released (I)

3) Set B lifts it's handset and completes call

Hook switch released (I)
                                  Handset on (O)
                                  Ring/Buzz off (O)
                                  Lamp 0 on (O)
                                  Update display – Active (O)
    Update display – Active (O)

4) Set A replaces it's handset (hangs up)

Hook switch released (I)
    Handset off (O)
    Update display – Idle (O)
    Lamp 0 off (O)
                                  Update display – Idle (O)
                                  Lamp 0 off (O)

5) Set B replaces it's handset

Hook switch released (I)
                                  Handset off (O)

Figure 2

METHOD FOR PUBLIC CONVERSATION INDICATION IN A TELEPHONY EXCHANGE

FIELD OF THE INVENTION

The present invention relates to a telephony exchange, a computer program product and a method for controlling a telephone call between two or more items of terminating equipment.

BACKGROUND OF THE INVENTION

Terminating equipment, such as a phone with a handset and/or a headset, is increasingly being equipped with hands free functionality. This enables parties to a telephone call both to initiate a call and to receive a call without lifting a handset or using the headset by using a microphone and speaker built into the phone.

Similarly, for VoIP (Voice over Internet Protocol) telephony where one or both parties to a phone call may be employing a computer, they may either use a headset or possibly use speakers and a microphone connected to a sound card incorporated in the computer.

Using the microphone and speaker built into the terminating equipment at one end of a call, however, means that a phone conversation may be overheard at that end of the call, so threatening the privacy of the phone call. As the quality of such hands-free enabled equipment improves, it becomes more and more difficult for one party to determine which type of operation another party at a remote end of a telephone call is employing. Nonetheless, for either security, privacy or personal preference reasons many users want to ensure, for all their conversations, selected conversations or portions of a conversation, that the other party is using the handset or headset in a private mode rather than operating in a public mode where a conversation may be overheard.

DISCLOSURE OF THE INVENTION

In a first aspect, the present invention provides a telephony exchange for establishing a telephone call between two or more items of terminating equipment comprising: a detector for determining an operating mode of an item of said terminating equipment, said mode comprising at least one of a public mode and a private mode, and an indicator, responsive to a determination made by said detector, for providing to at least one other item of said terminating equipment a first indication of the operating mode of said item of terminating equipment.

In a second aspect there is provided a computer program product comprising: a detector for determining an operating mode of an item of said terminating equipment in a telephone call between two or more items of terminating equipment, said mode comprising at least one of a public mode and a private mode, and an indicator, responsive to a determination made by said detector, for providing to at least one other item of said terminating equipment a first indication of the operating mode of said item of terminating equipment.

In a third aspect there is provided a method for controlling a telephone call between two or more items of terminating equipment comprising: determining an operating mode of an item of said terminating equipment, said mode comprising at least one of a public mode and a private mode, and responsive to a determination made in said determining step, providing to at least one other item of said terminating equipment a first indication of the operating mode of said item of terminating equipment.

The present invention allows terminating equipment to indicate whether a telephone call is public, where the telephone conversation may be heard by more than one person at a remote end of a call, or private, where a person at the remote end of a call employs, for example, a handset or a headset.

In a preferred embodiment, a calling party can restrict a called party from holding a call in a public mode if so desired either before or during the call.

In the preferred embodiment, the calling party is provided through their terminating equipment with an up-to-date graphical display, textual display or physical indication of the status of whether the called party is operating in a public mode.

In the preferred embodiment, the called party is also provided through their terminating equipment with an up-to-date graphical display, textual display or physical indication that they should not put a call on speaker, if the calling party has so decided. If the calling party decides during a call to restrict a call to private mode, the calling party's terminating equipment indicates this and also, if necessary, a prompt is played informing the called party to change to private mode.

The invention is applicable to any terminating equipment including analog and digital telephones with or without displays or multimedia terminals, for example, a computer where the called party, when required, must use a headset rather than computer microphone and speakers.

Using the invention, instead of relying on the quality of the call to determine if a call is public or private, the calling party terminating equipment has a feature that keeps them informed of the status of the call.

BRIEF DESCRIPTION OF THE DRAWINGS

Embodiments of the invention will now be described with reference to the accompanying drawings, in which:

FIG. 2 illustrates a messaging sequence involved in establishing a call between two phone sets connected to a single PBX;

DESCRIPTION OF THE PREFERRED EMBODIMENTS

Figure 1:
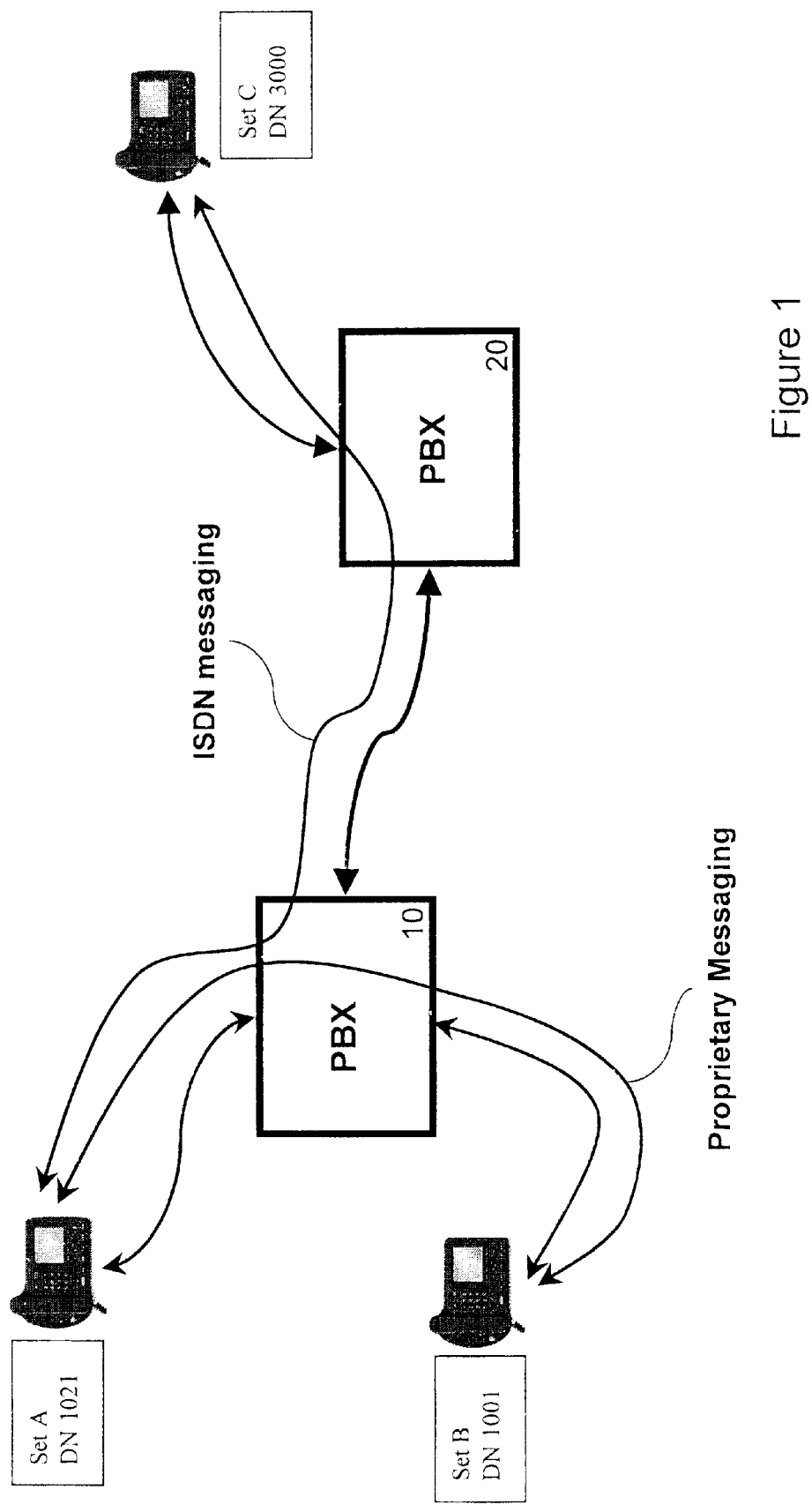
FIG. 1 is a schematic diagram of a telephone system including a PBX according to the invention.

FIG. 1 illustrates an environment where two embodiments of the invention can be implemented. In a first embodiment, telephone calls between phones Set A and Set B connected to the same exchange 10 may be determined to be private or public by either party to a call. In a second embodiment, telephone calls between phones connected to different exchanges 10, 20 may be determined to be private or public by either party to a call. The line labelled "proprietary messages", where proprietary messages are sent between, for example, a PBX (Private Branch Exchange) 10 and the Sets A and B, illustrates how such proprietary messages, can be used to signal the sets to provide the appropriate messages/indications as to the status of the call in terms of being hands-free or not. On the other hand, the line labelled ISDN messaging illustrates how messages conveying the status of the call could also be sent via ISDN messages, for example, a setup or facility message could be sent where either the calling or called party requests the call be private.

The embodiments of the invention will be described in more detail using some examples. In Example 1:

Tom using Set A rings Mary on either Set B or Set C.

Mary answers with hands-free and so the conversation is public.

Tom's set indicates that the call has been answered in a public mode.

Tom requests that the call be private by activating a programmable function key (referred to as a "Private DN (Directory Number) key") allocated for controlling hands-free operation.

Mary's set indicates Tom's desire to talk privately, and optionally a voice prompt is played telling Mary to go off hands-free.

If accepted, these two users can have a discussion with at least Mary's end operating in private mode—Tom's set indicates that the call is in private mode.

If not accepted Tom's set indicates that the call is in public mode.

In Example 2:

Tom using Set A activates private mode restriction on his set using, for example, the Private DN key.

Tom rings Mary on Set B or Set C.

Mary's set indicates that the call should not be answered hands-free, for example, by displaying a textual message to the effect "Private call, handset or headset only".

Pressing hands-free in this state will re-iterate using a display message or a warning tone that the call should not be answered hands-free. Tom's set indicates that the call has been answered in a public mode.

Otherwise, if the call is answered using, for example, a handset or headset, Tom's set indicates that the call has been answered in a private mode.

In general to implement the invention for a call established already and for an attempt to place that call on hands-free as in Example 1, or an attempt to receive an incoming call on hands-free as in Example 2; a message is sent to the calling party's phone to light an indicator or display a message (or send warning tone in the case of analog sets) to inform the calling party if the call is not a private call between 2 parties, but that one side has gone hands-free. It will be seen that while the examples provided are described in terms of one party setting a preference for a private mode of operation the invention works equally when two parties (or more than two parties where a call is a conference call) specify that the other party(s) operate in private mode.

Referring to FIG. 2, which shows a sequence for a conventional simple local, handset to handset, call internal to a PBX (Private Branch eXchange), for example, a Meridian M1 produced by Nortel Networks. SSD (Scan Signal Distribution) are messages between a phone and a line card within the PBX. Each message contains a TN (Terminal Number), a unique identifier associated with each phone, and a command control. In the example, (O) designates messages Outgoing from PBX to set, and (I) designates messages Incoming to PBX from set.

Thus, when at step 1, the handset is lifted on Set A, an SSD message indicating that the hook switch has been released is transmitted to the PBX 10. The PBX then sends a series of messages to Set A, turning the handset on, turning on any lights associated with lifting the handset and updating the display accordingly and possibly setting a dial tone on. (Alternatively, a dial tone may not be turned on, until it is determined that a user requires an outside line.)

At step 2, the user begins to dial the required number—in this case 1001. Each time a key pad button is pressed, a corresponding message is sent to the PBX 10 and the PBX 10 responds by adding the displayed digit to the display of Set A. When the last digit is dialled, the PBX then sends messages to the dialled extension, Set B. In this case, the messages cause a light to flash and the ringer to ring on Set B. The display on Set B may also be updated to indicate the caller number.

At step 3, the user of Set B picks up the handset to answer the call, and the PBX detects that the hook switch is released when it receives an appropriate message from Set B. The PBX then sends a message instructing Set B to turn on the handset, turn off the ringer, turn the flashing light on permanently and to update the display accordingly. A message is also sent to Set A, updating the display. It will be seen that because the PBX received a message indicating the Set B had picked up the handset, it knows that end of the call is operating in a private mode. It may therefore cause the display on Set A to show that the call is private. The same applies to indicating on Set B that Set A is operating in private mode.

It should be seen that the type of phone determines the nature of the indication. Where the phone has a display, this can display a message, if not, a designated lamp can flash, or a lamp can flash with a pre-determined pattern. Alternatively, a message can be played to the user.

If on the other hand, at step 3, a call was answered by Set B on hands free i.e. the call is taken by pressing a programmable key (known as a DN key), then step 3 would be replaced by the following:

DN key pressed (I)

Ring/Buzz off (O)

Lamp 0 on (O)

Update display—Active (O)

Hands free on (O)

Hands free microphone on (O)

DN key released (I)

From this, the PBX knows that the call was answered on hands free and can then send a message to Set A to indicate that the call is not private (light a lamp, buzz, etc).

The phone call continues as normal, until one party or the other either replaces their handset or presses the Private DN key. In the example of FIG. 2, at step 4, Set A replaces the handset. This causes conventional messages to be exchanged turning off the handset for Set A and updating the displays and lights of Set A and Set B. Finally, at step 5, Set B replaces its handset, indicated to the PBX with a message and so its handset is turned off.

In the preferred embodiment, the privacy feature is programmed on the PBX to a Private DN key on the set. If the user presses the Private DN key, activating the privacy feature, the SSD sequence would be as follows:

Feature key pressed (I)

Key Lamp on (O)

Feature Key released (I)

Internally in the PBX software, a flag is set to state that all calls from this set are of a private nature until the key is pressed again to turn off the privacy feature.

When the set makes a call to a local set, if the destination set attempts to take the call on hands free or with the call established on handset, attempts to go to hands free, then the PBX software, on receipt of the associated SSD message indicating that the call is being taken in a public mode, will check the privacy flag on the originator.

The PBX can be set so it refuses the attempt and indicates this, for example, by updating the display, lighting a led, sounding a tone, etc at the destination set. Thus, if the phone were ringing, it would continue to ring without going to hands-free; or during a phone call, the destination set handset would thus not be turned off and the hands free and the hands free microphone would not be turned on.

Alternatively, having sent the message to the destination set, the PBX could then simply update the display and/or any lamps of the caller set to show that the destination set is operating in a public mode.

In any case, the user of the caller set may then be requested orally or otherwise by the called party to turn off the privacy feature. If the caller complies, then the flag can be updated and the called party can then freely operate in public mode.

It should be seen that while the first embodiment has been described in terms of a calling party determining whether or not a called party should operate in private mode, it is equally possible to implement the invention to operate where the called party has their privacy feature set and requires the calling party to operate in private mode. In this case, where a call to such a party has been initiated in a hands free public mode, the calling party's phone may either indicate to the caller while the phone is ringing or as it is answered, that the called party requires the caller to, for example, pick-up the handset or use a headset.

Turning now to the second embodiment of the invention. In this case, phone Set A with number 1021 calls phone Set C with number 3000, FIG. 1. As is known in ISDN messaging, a D-channel carries control signalling for a plurality of associated calls, each call comprising a bearer channel. In the examples, FIGS. 3 & 4, DCH 6 is the D-Channel for Set A, while DCH 7 is the D-Channel for Set C.

Figure 5:
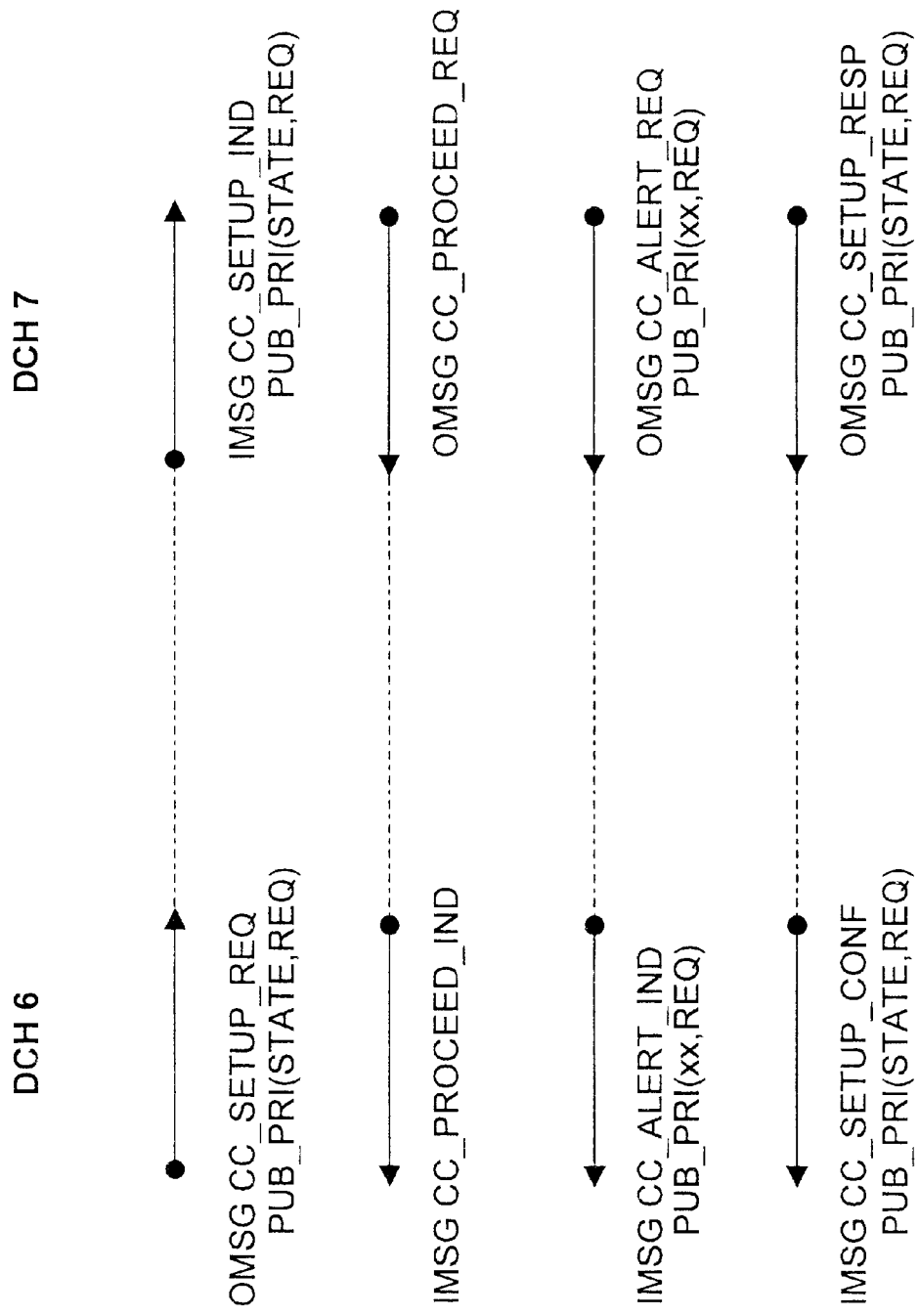
FIG. 5 graphically illustrates a messaging sequence according to a second embodiment of the invention.

Implementation of the invention does not require any changes to the basic messaging sequence, but in the preferred embodiment, a new information element (IE) is added to the ISDN setup request message to indicate to the called party's PBX if the privacy feature has been activated by a caller prior to a call being made and also whether or not the caller is operating in public or private mode, FIG. 5. This setup request message is normally sent by the calling user to the network and by the network to the called user to initiate call establishment. The new information element could be added to any message of the sequence of messages required to setup a call, but it will be seen that the setup request message is the first and most often present of the sequence and gives a PBX the maximum opportunity to determine the privacy status of the called/calling party.

The following is a basic breakdown of an example information element, PUB_PRI:

PUB_PRI: 99 02 HH HH

| | |
|---|---|
| 99 | Information element identifier |
| 02 | Length of Information element |
| HH | Phone Set State |
| HH | Phone Set Privacy Requirement | where HH=00 for public and HH=01 for private.

If a PUB_PRI value of "99 02 00 01" is used in a setup request, it indicates to a receiving PBX, that the caller set is in public mode, e.g. operating hands-free, and that the destination set should operate in private mode. The receiving PBX, if compliant with the invention, may then indicate the privacy requirement and the public state of the caller set as it wishes to the destination set. If a PUB_PRI value of "99 02 01 00" is used in a request, it indicates to the receiving PBX, that the destination set can operate in public mode and that the calling set is in private mode, e.g. the caller has used the handset to initiate the call. Again, the receiving PBX, if compliant with the invention, may then indicate this as it wishes to the destination set.

In the present example, in response to a setup request message from PBX 10, PBX 20 eventually issues a setup response message received at the PBX 10 as a setup confirm message. If the PBX 20 is compliant with the invention, it will include a PUB_PRI IE in the setup response. (If the PBX 20 is non-compliant and the caller has a privacy requirement there will be no PUB_PRI IE and the caller's PBX 10 can make a suitable indication to the caller set. It will also been seen that the invention will not adversely affect calls made from a non-compliant PBX to a compliant PBX.) It is only at this stage, when the user of the called set has picked up the handset or initiated hands-free operation of the set that the PBX 20 will know the privacy slate of the set being called. Before this stage, for example, if the PUB_PRI IE is included in an alert request message, the PUB_PRI IE can only be used to indicate a privacy requirement of the called set. If, a PUB_PRI value of "99 02 xx 01" is used in such a message, it indicates to the PBX 10, that the destination set wishes the calling set to operate in private mode. The calling PBX 10 may then indicate this as it wishes to the calling set. If a PUB_PRI value of "99 02 xx 00" is used in a response, it indicates to the PBX 10, that the destination has no privacy requirement. Again, the PBX 10 may then indicate this as it wishes to the calling set. (In each case, the value of the phone set state byte xx is not relevant.)

As stated above, it is only when the setup confirm message is received at the PBX 10 that the calling PBX knows whether or not the destination set is in fact operating in private or public mode. If it has a value of "99 02 01 xx", it indicates that the call has indeed been taken privately, whereas if it has a value of "99 02 00 xx", it indicates that the call in spite of any requirement to the contrary has been taken publicly. It is then down to the PBX 10 to make the appropriate indication to the calling set.

Figure 4:
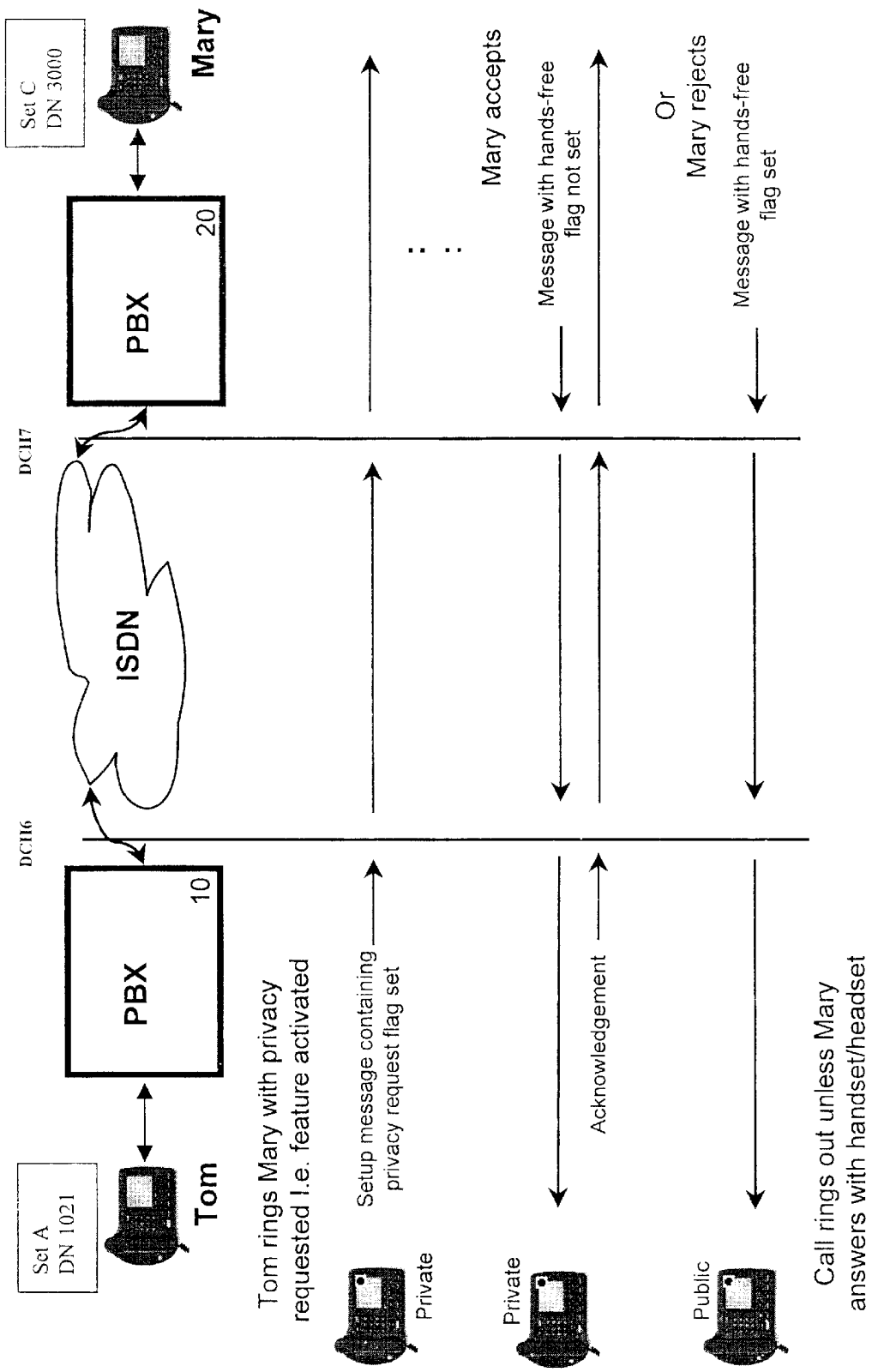

So in the example, illustrated in FIG. 4, included in the SETUP message below for a call between Set A and Set C is the new Information Element (IE), 99 named PUB_PRI:

DCH 6 UIPE_OMSG CC_SETUP_REQ REF 00000011 CH 6 5 TOD 10:34:50

PRIM HDR: 01 00 01 00 53 00

MSG HDR: 08 02 11 00 0E 00

BCAP: 01 0D 13 00 01 10 00 00 23 00 00 00 00 00 00

CHID: 09 09 0D 00 29 00 03 00 01 00 05

PROGI: 1E 04 03 00 01 83

CLG#: 05 0A 07 00 62 00 04 00 01 0A 02 01

CAD#: 03 0A 03 00 62 00 04 00 03 0A 0A 0A

SNCMP: 23 00

SRVIN: 24 04 03 00 01 01

TRCNT: 27 03 01 00 00

PCATG: 1D 03 01 00 01

PUB_PRI: 99 02 00 01

This means Tom requires Mary to operate privately, but in fact has initialised the call with Set A in hands-free mode.

Other messages such as Proceed and Alert requests and responses follow and the messaging sequences ends with a setup confirmation message, as shown below:

DCI 6 UIPE_IMSG CC_SETUP_CONF REF 00000011 CH 6 5 TOD 10:34:52

PRIM HDR: 2F 00 01 00 1E 00
MSG HDR: 08 02 11 00 30 00
PROGI: 1E 04 03 00 81 82
CONN#: 0C 0A 07 00 62 80 04 00 03 0A 0A 0A
PCATG: 1D 03 01 00 81
PUB_PRI: 99 02 xx 00

This means that Mary's set has no privacy requirement.

If xx is 01, it means Mary is operating in private mode, as required. If xx is 00, it means Mary, presumably in spite of indications not to do so, has been permitted by the PBX 20 to operate in hands-free mode, and so must be asked to switch to private mode or the call is terminated.

It will be seen that the IE in the setup request message contains all the information necessary to inform the called parties PBX that a restriction has been placed on the call being answered in a public mode. If the called parties PBX is compliant with the invention, then it can then restrict the call being answered or during the call being put on hands free.

Figure 3:
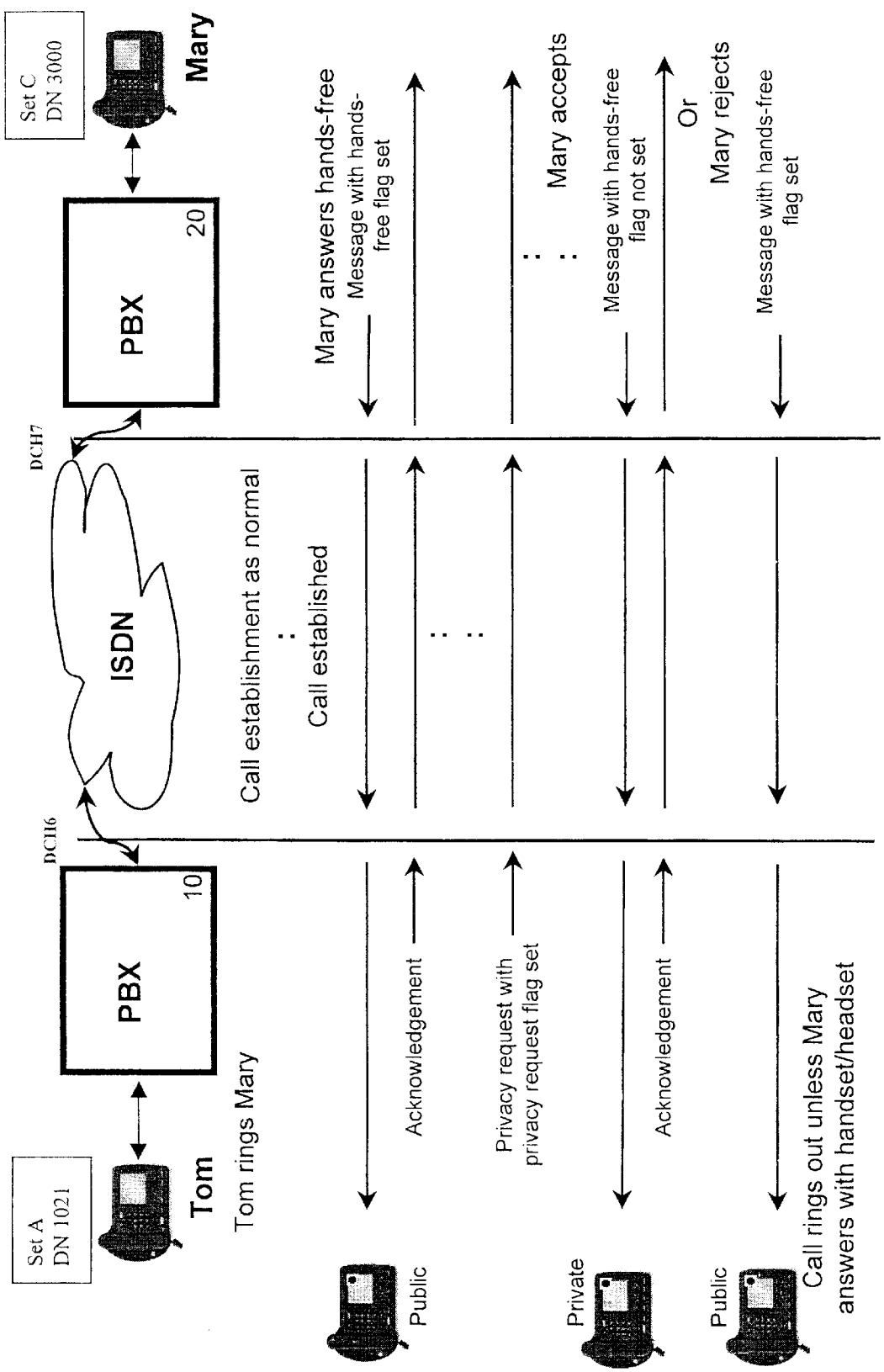
FIGS. 3 and 4 illustrate the operation of a second ISDN based embodiment of the invention.

Turning now to Example 2, which is illustrated in FIG. 3. During the course of a call, one or other of the parties wishes to request the other party to operate in private mode. In this example, Tom presses his Privacy DN key. To implement the invention for such cases, the same PUB_PRI IE can be included within a Facility message transmitted from PBX 10 to PBX 20. (Facility messages are typically used to implement features such as Call Forwarding or Call Transfer, which may be required during the course of a call.) Thus, the IE would be "99 02 xx 01". Again in this case, the value of the phone set state byte xx is not relevant, although it can be set to indicate the state of Set A.

PBX 20 generates the appropriate indication on Set C and responds with a facility message including a PUB_PRI IE of the form "99 02 xx yy". If a handset has been picked up or a headset switched on at Set C in response to the indication, then xx will be set to 01, otherwise xx will be set to 00. Again in this case, the value of the privacy requirement byte yy is not relevant, although it can be set to indicate if the privacy feature button has been pressed on Set C.

It will be seen that the principles of the invention can be applied to any telephony exchange, be it web client software such as NetMeeting from Microsoft for VoIP calls where messages are transmitted across the Internet, or even mobile phone calls where messages are transmitted across the GSM network. Furthermore, it will be seen that the invention is not necessarily limited to voice calls and could be adapted to be implemented within video calls.

It is conceded that at present it may be difficult to implement the invention within the PSTN as the hands-free capability of phone sets connected to the PSTN is largely implemented by proprietary mechanisms. Nonetheless, it is possible for PSTN signalling to be defined to allow the invention to be implemented by phone sets which could then be designed to comply with the invention. Where a compliant phone set attempts to call a non-compliant phone set, then a suitable indication can be made to the user of the compliant phone set that a determination cannot be made as to the mode of operation of the other phone set.

It will also be seen that the privacy aspect of a call can be extended to messages left in a called party's voice mailbox. Thus, if a caller has set a privacy requirement before making a call, and is put through to the called party's mailbox, then when the called party attempts to pick up their voice mail, the exchange may require that they do this either by picking up the handset or using a headset.

Finally, it will be seen that while the embodiments have been described in terms of a user pressing a function key to indicate that they require a private or only a public mode of operation by the other party to a telephone call, it will be seen that this indication can be made by any suitable means, for example, by entering special prefix codes or even using hook flash commands on an analog phone.

What is claimed is:

1. A telephony exchange for establishing a telephone call between two or more phone sets comprising:
   a detector for determining that a first one of said phone sets is operating in a public mode, and
   an indicator, responsive to a determination made by said detector, for providing to at least one other of said phone sets a first indication of the public mode of operation of said first phone set.

2. A telephony exchange as claimed in claim 1 wherein said detector is responsive to a party pressing a hands free button on a phone set to determine said item of terminating equipment is operating in a public mode.

3. A telephony exchange as claimed in claim 1 comprising:
   a second detector, responsive to a signal from a phone set, for determining that a party employing said phone set wishes other phone sets to operate in a private mode; and
   a second indicator, responsive to a determination made by said second detector, for providing a second indication to at least one of said other phone sets that said one party wishes said phone set to operate in a private mode.

4. A telephony exchange as claimed in claim 3, wherein said exchange comprises memory for storing said second indication that said party employing said phone set wishes calls to be taken in a private mode.

5. A telephony exchange as claimed in claim 3, wherein said exchange is responsive to said second indication to prevent a phone set from operating in a public mode.

6. A telephony exchange as claimed in claim 3, wherein said exchange is responsive to said second indication to prevent a phone set from changing to a public mode during said call.

7. A telephony exchange as claimed in claim 1 wherein said first indicator is arranged to update a graphical display on phone set.

8. A telephony exchange as claimed in claim 1 wherein said first indicator is arranged to update a textual display on said phone set.

9. A telephony exchange as claimed in claim 1 wherein said first indicator is arranged to provide a physical indication on said phone set.

10. A telephony exchange as claimed in claim 3 wherein said second indicator is arranged to update respective graphical displays on said at least one other phone set.

11. A telephony exchange as claimed in claim 3 wherein said second indicator is arranged to update respective textual displays on said at least one other phone set.

12. A telephony exchange as claimed in claim 3 wherein said second indicator is arranged to provide a physical indication on said at least one other phone set.

13. A telephony exchange as claimed in claim 3 wherein said exchange is responsive to said second indication to play a prompt requesting a called party to operate in a private mode on any of said other phone sets operating in a public mode.

14. A telephony exchange as claimed in claim 1 wherein at least one phone set comprises a multimedia terminal.

15. A telephony exchange as claimed in claim 1 wherein said exchange is a private branch exchange (PBX) and said two or more phone sets are connected to said exchange.

16. A telephony exchange as claimed in claim 1 wherein said exchange is a PBX, said PBX is adapted to communicate with one or more other private branch exchanges using ISDN messaging and at least one item of said two or more phone sets is connected to one of said other private branch exchanges.

17. A computer program product comprising:
a detector for determining that a first phone set in a telephone call between two or more phone sets, is operating in a public mode, and
an indicator, responsive to a determination made by said detector, for providing to at least one other of said phone sets a first indication of the public mode of operation of said first phone set.

18. A method for controlling a telephone call between two or more phone sets comprising:
determining that one of said phone sets is operating in a public mode, and
responsive to a determination made in said determining step, providing to at least one other of said phone sets a first indication of the public mode of operation of said first phone set.

19. A computer program for controlling a telephone call between two or more phone sets, said computer program being arranged to control the telephony call such that:
a public operating mode of one of said phone sets is determined, and a first indication of the public mode of operation of said one of said phone sets is provided to at least one other of said phone sets, responsive to a determination made in the determining step.

20. A communications network comprising a telephony exchange for establishing a telephone call between two or more phone sets comprising:
a detector for determining that a first one of said phone sets is operating in a public mode, and
an indicator, responsive to a determination made by said detector, for providing to at least one other of said phone sets a first indication of the public mode of operation of said first phone set.

21. An item of terminating equipment comprising a computer program product, wherein said computer program product comprises:
a detector for determining that a first phone set in a telephone call between two or more phone sets is operating in a public mode, and
an indicator, responsive to a determination made by said detector, for providing to at least one other of said phone sets a first indication of the public mode of operation of said first phone set.

22. A telephony exchange comprising a computer program product, wherein said computer program product comprises:
a detector for determining that a first phone set in a telephone call between two or more phone sets is operating in a public mode, and
an indicator, responsive to a determination made by said detector, for providing to at least one other of said phone sets a first indication of the public mode of operation of said first phone set.

* * * * *